United States Patent [19]

Koike

[11] Patent Number: 4,951,300

[45] Date of Patent: Aug. 21, 1990

[54] PRECISION POSITION DETECTION DEVICE

[75] Inventor: Kazumasa Koike, Iida, Japan

[73] Assignee: Tamagawa Seiki Kabushiki Kaisha, Tokyo, Japan

[21] Appl. No.: 332,528

[22] Filed: Mar. 31, 1989

[30] Foreign Application Priority Data

Dec. 1, 1988 [JP] Japan ................................. 63-32180

[51] Int. Cl.$^5$ ........................ G06M 3/00; G01R 25/08
[52] U.S. Cl. ........................................ 377/17; 377/45;
324/207.25; 340/870.31; 307/515
[58] Field of Search ............... 377/17, 45; 324/207.11,
324/207.12, 207.23, 207.25; 340/870.31;
307/515

[56] References Cited

U.S. PATENT DOCUMENTS

| | | | |
|---|---|---|---|
| 3,206,616 | 9/1965 | Webb | 307/515 |
| 3,641,535 | 2/1972 | Itnopf | 340/870.31 |
| 4,007,357 | 2/1977 | Yanagishima | 377/45 |
| 4,266,215 | 5/1981 | Adams | 377/17 |
| 4,764,767 | 8/1988 | Ichikawa et al. | 324/207.25 |
| 4,847,879 | 7/1989 | Iijima et al. | 377/45 |
| 4,881,248 | 11/1989 | Korechika | 377/17 |

Primary Examiner—John S. Heyman
Attorney, Agent, or Firm—Brooks Haidt Haffner & Delahunty

[57] ABSTRACT

This invention relates to a precise position device, particularly to such device in which an insensitive zone of an absolute signal consisting of a stepped analog signal formed on the basis of the two-phase incremental position detection signal obtained from an encoder section is eliminated, and an output signal having an approximately linear form may be obtained.

1 Claim, 3 Drawing Sheets

PRECISION POSITION DETECTION DEVICE

BACKGROUND OF THE INVENTION

Field of the Invention

This invention relates to a precise position detection device and, more particularly, to such device in which an insensitive zone of an absolute signal consisting of a stepped analog signal formed on the basis of the two-phase incremental position detection signal obtained from an encoder section is eliminated, and an output signal having an approximately linear form may be produced.

Up to now, a variety of different constructions have been employed for this type of the precise position detection devices. The device produced by the present Assignee and shown herein in FIG. 1 may be said to be representative of these known devices, although the title of the literature showing the construction is not recited herein.

Referring to FIG. 1, the numeral 1 designates a rotary encoder having a rotary shaft 1a. When the shaft 1a is rotated in the direction of an arrow mark $\theta$, a two-phase incremental position detection signals 2, presenting a phase difference of 90° from each other, are transmitted via a jumper wire 3 to an up/down counter 4.

A digital signal 5, corresponding to the amount of the two-phase incremental position detection signal, is supplied from the up/down counter 4 to a D/A converter 6. An analog position signal 7, which is an analog voltage signal in the form of a step wave shown in FIG. 2, is outputted from this D/A converter 6.

The above described conventional precise position detection device has the following disadvantages.

That is, in the above described conventional arrangement, when the rotary shaft 1a of the encoder section 1 is revolved and the input angle is changed within the "0" value range of the digital value of the analog position signal 7 shown in FIG. 2, the output value of the analog position signal 7 remains to be "0". Thus it is impossible to detect the changes in the input angle $\theta$ caused by such minute rotation of the rotary shaft 1a.

While the input angle $\theta$ is changed continuously, the analog position signal 7, detected as a function of the input angle $\theta$, is in the form of a step wave, as shown in FIG. 2, and thus presents a dead or inoperative zone for the output value of "0". Thus it is impossible to provide a high sensitivity or high precision type position detection device capable of detecting even a minute input angle.

Also, since the analog position signal 7 is in the form of a step signal in its entirety, dead zones are produced not only for the zero digital value, but also for the overall domain including the positive and negative domains, thus lowering the sensitivity and the precision of the detection device.

SUMMARY OF THE INVENTION

For obviating the above deficiencies of the prior art detection device, the present invention provides a precise position detection device wherein the dead zone or the inoperative zone of the absolute signals consisting of analog signals in the form of step signals which are formed on the basis of the two phase incremental position detection signals outputted from the encoder section.

In accordance with the present invention, there is provided a precision position detection device comprising an encoder for outputting two-phase incremental position detection signals of SIN and COS waveforms, a pair of comparators for waveforming said two-phase incremental position detection signals into rectangular wave signals, an inverting amplifier for obtaining an inverted waveform of said SIN wave, an up/down signal converter for converting said rectangular wave signals into up/down directive pulses, an up/down counter for receiving said directive pulses and outputting absolute digital signals, a D/A converter for converting said absolute digital signals into analog position signals in the form of step signals, and an analog switch control circuit for receiving said rectangular signals and said absolute digital signals and summing said SIN wave and $\overline{\text{SIN}}$ wave to said analog position signals, said analog position signals obtained in synchronism with the rising and falling edges of the rectangular wave signals corresponding to said COS wave being summed to said SIN and $\overline{\text{SIN}}$ waves to produce precision analog detection signals.

In the precision position detection device according to the present invention, the aforementioned analog position signals are summed to SIN and $\overline{\text{SIN}}$ waves to eliminate the dead or inoperative zone and hence ambiguities within the digital "0" value and detection precision or linearity may be improved in digital values other than "0".

Also the absolute digital signals are obtained in synchronism with the rising and falling edges of the rectangular wave signals corresponding to the COS wave, so that the digital signals having the double frequency may be obtained with additionally improved linearity.

DESCRIPTION OF THE PREFERRED EMBODIMENT

Figure 1:
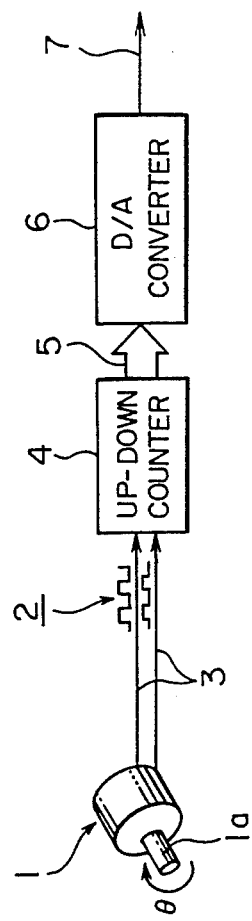
FIG. 1 is a diagrammatic block diagram showing a conventional precision position detection device.
Figure 2:
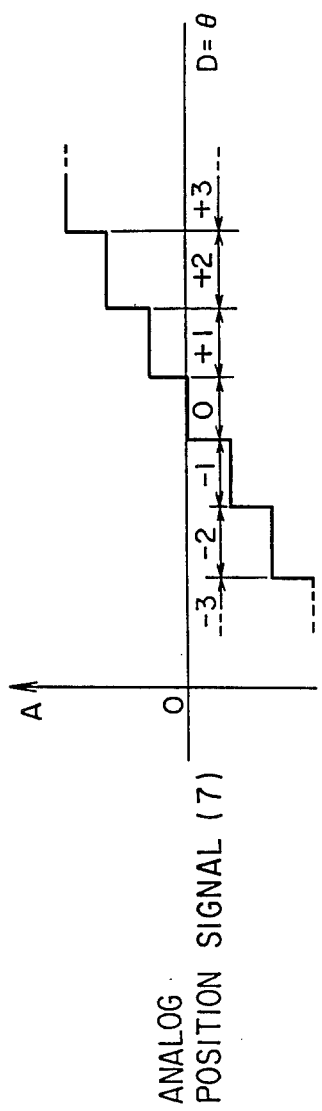
FIG. 2 is a waveform diagram of analog signals generated by the detection device of FIG. 1.

By referring to the drawings, a preferred embodiment of a precision position detection device according to the present invention will be explained hereinbelow in more detail. It will be noted that the same reference numerals are used to depict the same or equivalent parts to those of the conventional detection device.

Figure 3:
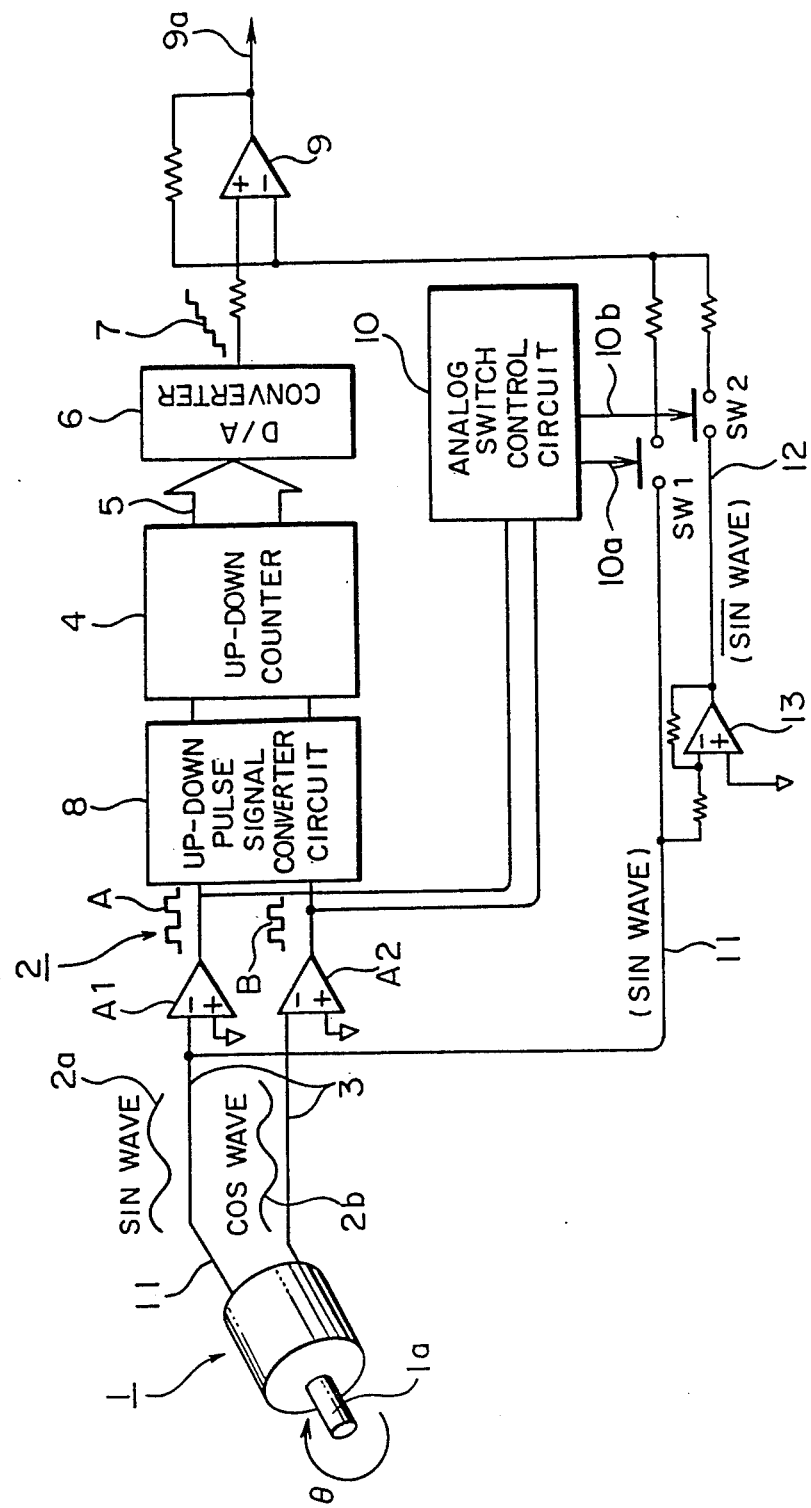
FIG. 3 is a diagrammatic block diagram showing an embodiment of a precision position detection device according to the present invention.
Figure 4:
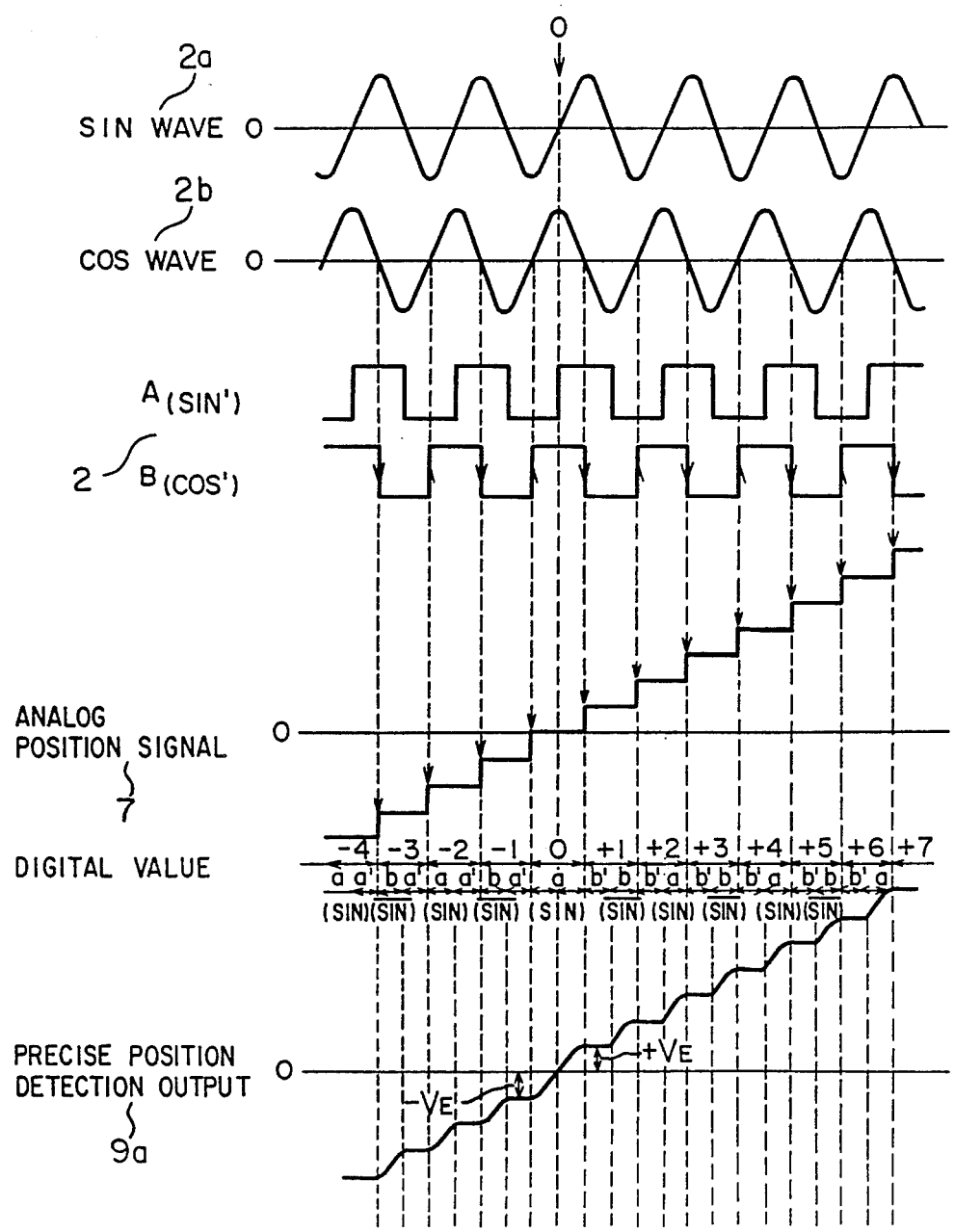
FIG. 4 is a waveform diagram of analog signals generated by the detection device of FIG. 3.

FIGS. 3 and 4 illustrate the precision position detection device according to the present invention. In these figures, the numeral 1 designates a rotary encoder having a rotary shaft 1a. When the rotary shaft 1a is turned in the direction shown by an arrow mark $\theta$, two-phase incremental position detection signals 2a and 2b in the form of sine (SIN) and cosine (COS) waves having a phase difference of 90° from each other, are introduced via a jumper wire 3 to a pair of comparators A1 and A2, where the two-phase incremental position detection signals 2a and 2b are wave-formed into a two-phase incremental position detection signal 2 consisting of a pair of rectangular waves A and B corresponding to the signals 2a and 2b, as shown in FIG. 4.

These two-phase incremental position detection signal 2, consisting of rectangular signals A and B, are converted by an up/down pulse signal converting circuit 8 into up/down directive pulses, which are then introduced into an up/down counter 4 for conversion into an absolute digital signal 5.

This absolute digital signal 5 is outputted via a D/A converter 6 as the analog signal 7 in the form of a step signal so as to be introduced into an operational amplifier 9.

The two-phase incremental position detection signal 2, consisting of the rectangular waves A and B, are supplied to an analog switching control circuit 10, the switching synchronization of which is obtained by the two-phase incremental position detection signals (rectangular waves A and B). Control signals 10a and 10b of this analog switching control circuit 10 are inputted for controlling the switching of first and second switches SW1 and SW2. The input terminal of the first switch SW1 is connected to the first output line 11 of the rotary encoder 1 and the sine (SIN) wave 2a is also introduced.

An output line 12 of a $\overline{SIN}$ wave, which is inverted from the SIN wave by an inverting amplifier 13, is introduced to an input terminal of the second switch 2a, while the output ends of these switches SW1 and SW2 are connected to the operational amplifier 9.

The above described precision position detection device according to the present invention, operates as follows:

The two-phase incremental position detection signals 2a and 2b, obtained from the rotary encoder 1, are wave-formed into rectangular wave signals A and B shown in FIG. 4 by comparators A1 and A2.

These rectangular wave signals A and B are the same as the two-phase incremental pulse signals of the prior art device, and are supplied to the up/down pulse converting circuit 8, where the count direction is determined. The signals A and B are then supplied to the up/down counter 4 where they are converted into absolute digital signals 5.

These absolute digital signals 5 are converted by a D/A converter 6 into the aforementioned analog position signals 7, the number of which is counted by the timings of the rising and falling edges of the rectangular wave signal B by the incremental position detection signal 2b of the COS waves, as indicated by the arrow marks in FIG. 4. The count value is then converted in the D/A converter 6 into the double frequency analog position step output signals, which are introduced into the operational amplifier 9.

Simultaneously, the analog switches SW1 and SW1 are commutated sequentially by the rectangular wave signals A and B from the comparators A1 and A2 so that, in each domain a of the digital value in FIG. 4, the analog switch SW1 is turned on and the $\overline{SIN}$ waveform is applied by the operational amplifier 9 for the analog position signal 7 of the D/A converter 6 and, in each domain b of each digital value in FIG. 4, the analog switch SW2 is turned on and the $\overline{SIN}$ waveform applied by the operational amplifier 9 for the analog position signal 7 of the D/A converter 6.

In this manner, the output waveform of the operational amplifier 9 is a continuously changing output waveform, as the precision position detection output 9a shown in FIG. 4, and thus in a manner distinct from the step signal form of the prior art.

Although the foregoing description has been made with respect to a rotary encoder, it is to be noted that the same operation and result may also be obtained with a linear encoder.

What is claimed is:
1. A precision position detection device comprising an encoder for outputting two-phase incremental position detection signals of SIN and COS waveforms,
 a pair of comparators for waveforming said two-phase incremental position detection signals into rectangular wave signals,
 an inverting amplifier for obtaining an inverted waveform of said SIN wave,
 an up/down pulse signal converter for converting said rectangular wave signals into up/down directive pulses,
 an up/down counter for receiving said directive pulses and outputting absolute digital signals,
 a digital to analog (D/A) converter for converting said absolute digital signals into analog position signals in the form of step signals, and
 an analog switch control circuit for receiving said rectangular wave signals and said absolute digital signals and summing said SIN wave and $\overline{SIN}$ wave to said analog position signals,
 said analog position signals obtained in synchronism with the rising and falling edges of the rectangular wave signal corresponding to said COS wave being summed to said SIN and $\overline{SIN}$ waves to produce precision analog position detection signal.

* * * * *